United States Patent
Griffin

(10) Patent No.: US 8,258,424 B2
(45) Date of Patent: Sep. 4, 2012

(54) PLASMA TORCH WITH ELECTRODE WEAR DETECTION SYSTEM

(75) Inventor: David C. Griffin, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 590 days.

(21) Appl. No.: 12/544,777

(22) Filed: Aug. 20, 2009

(65) Prior Publication Data
US 2011/0042357 A1 Feb. 24, 2011

(51) Int. Cl.
*B23K 10/00* (2006.01)

(52) U.S. Cl. ............... 219/121.5; 219/75; 219/76.16; 219/121.48; 219/121.51; 219/121.59

(58) Field of Classification Search ............ 219/75, 219/76.16, 121.5, 39–59, 130.32, 138
See application file for complete search history.

(56) References Cited

U.S. PATENT DOCUMENTS

| | | | |
|---|---|---|---|
| 4,567,346 A | 1/1986 | Marhic | |
| 4,682,005 A * | 7/1987 | Marhic | 219/121.48 |
| 4,914,271 A | 4/1990 | Delzenne et al. | |
| 4,929,811 A * | 5/1990 | Blankenship | 219/121.54 |
| 4,959,520 A | 9/1990 | Okada et al. | |
| 5,120,930 A * | 6/1992 | Sanders et al. | 219/121.5 |
| 5,164,569 A | 11/1992 | Porra et al. | |
| 5,183,990 A * | 2/1993 | Enyedy | 219/121.54 |
| 5,506,384 A * | 4/1996 | Yamaguchi | 219/121.57 |
| 5,695,662 A * | 12/1997 | Couch et al. | 219/121.39 |
| 5,717,187 A | 2/1998 | Rogozinski et al. | |
| 5,808,270 A * | 9/1998 | Marantz et al. | 219/121.47 |
| 5,844,196 A | 12/1998 | Oakley | |
| 5,859,403 A | 1/1999 | Zigliotto | |
| 5,886,315 A | 3/1999 | Lu et al. | |
| 5,900,169 A | 5/1999 | Borowy et al. | |
| 5,938,949 A | 8/1999 | Enyedy et al. | |
| 5,994,663 A | 11/1999 | Lu | |
| 6,133,543 A | 10/2000 | Borowy et al. | |
| 6,163,008 A * | 12/2000 | Roberts et al. | 219/121.48 |

(Continued)

FOREIGN PATENT DOCUMENTS

FR 2 839 606 A1 11/2003

OTHER PUBLICATIONS

Extended European Search Report for related European Patent Application No. 10251331.4, mailed Dec. 3, 2010, received Dec. 6, 2010.

*Primary Examiner* — Michael Lebentritt

(57) ABSTRACT

A plasma arc torch is provided that includes a wear stop designed to detect wear of an electrode and prevent the use of the electrode once the electrode has experienced a certain amount of wear. Either the electrode or the nozzle is movable with respect to the main torch body, and the movable component defines a projection. The wear stop is positioned a predetermined distance from a nozzle of the torch, such that prior to experiencing an excessive amount of wear, the electrode is able to contact the nozzle and initiate a pilot arc for starting a torch operation. Once the length of the electrode becomes shorter than a predetermined length due to wear, the projection of the electrode engages the wear stop, and the wear stop prevents the electrode from contacting the nozzle. In this way, an electrode that is excessively worn cannot be used in subsequent torch operations.

22 Claims, 10 Drawing Sheets

U.S. PATENT DOCUMENTS

| | | |
|---|---|---|
| 6,191,381 B1 | 2/2001 | Kabir |
| 6,963,045 B2 * | 11/2005 | Zapletal et al. .......... 219/121.48 |
| 6,969,819 B1 | 11/2005 | Griffin |
| 8,035,055 B2 * | 10/2011 | Twarog et al. ........... 219/121.41 |
| 2001/0007320 A1 * | 7/2001 | Severance et al. ....... 219/121.48 |
| 2002/0139782 A1 * | 10/2002 | Onitsuka et al. ......... 219/121.48 |
| 2006/0163219 A1 | 7/2006 | Griffin |
| 2007/0262060 A1 * | 11/2007 | Roberts et al. ............. 219/121.5 |
| 2009/0032502 A1 | 2/2009 | Eickhoff et al. |
| 2011/0062124 A1 * | 3/2011 | Duan et al. ................. 219/121.5 |

* cited by examiner

PLASMA TORCH WITH ELECTRODE WEAR DETECTION SYSTEM

BACKGROUND

The present application relates to plasma arc torches, particularly plasma arc torches of the so-called blow-back type.

Plasma torches are commonly used for cutting or marking metal work pieces. In general, plasma torches use an electrode to generate an electric arc within the torch. A high velocity gas is flowed through the torch, and the electric arc ionizes the gas, creating a plasma. The high velocity stream of ionized gas, or plasma, is delivered through a nozzle of the torch towards the work piece that is to be cut. The plasma serves to conduct electricity from the torch to the work piece. In this way, the plasma heats the work piece, melting the metal in the location of the cut, and mechanically blows the molten metal away to form the cut.

In blow-back torches, the nozzle is generally fixed with respect to the torch body, and the electrode is displaceable with respect to the nozzle. Initially, the electrode is in contact with the nozzle. When the blow-back torch is activated, for example through a user's actuation of a trigger, a voltage differential is applied between the nozzle and the electrode, and a plasma gas (such as air) flows through the torch to the nozzle. The gas flow causes the electrode to "blow back" out of contact with the nozzle, establishing a pilot arc between the electrode and the nozzle. At the same time, the gas flows out of the nozzle, transferring the arc to the work piece to perform the torch operation.

In blow-forward torches, the electrode is generally fixed with respect to the torch body, and the nozzle is displaceable with respect to the electrode. As with blow-back torches, the nozzle is initially in contact with the electrode. Once the blow-forward torch is activated, however, and the voltage differential is applied between the nozzle and the electrode, the flow of plasma gas causes the nozzle to "blow forward" out of contact with the nozzle. In this way, the pilot arc is established between the electrode and the nozzle, and gas flows out of the nozzle, transferring the arc to the work piece as described above.

Users of plasma torches (blow-back and blow-forward) are often required to replace the electrode used in the torch as the electrode experiences wear during plasma torch operations. The use of an excessively worn electrode may cause damage to the plasma torch and the work piece and, more importantly, may present safety concerns to the user of the plasma torch.

Applicant has thus discovered that it would be desirable to provide a plasma torch in which the electrode wear can be detected and the use of an excessively worn electrode can be prevented. As described in greater detail below, a variety of challenges were identified and overcome through Applicant's efforts to invent and develop such a plasma torch.

BRIEF SUMMARY

A plasma arc torch, electrode, and method are therefore provided for allowing a user to detect the wear on an electrode. In particular, a plasma arc torch is provided that includes a wear stop designed to detect wear of an electrode and prevent the use of the electrode once the electrode has experienced a certain amount of wear.

In one exemplary embodiment, the plasma arc torch includes a main torch body and an electrically conductive nozzle defining an orifice for gas flow therethrough towards a work piece. The torch also includes an electrode holder arranged within the main torch body, and an electrode that is releasably attached to the electrode holder and projects from the electrode holder in a forward direction towards an opposing surface of the nozzle. The electrode defines an end face and an axial length L, the length L decreasing as the end face of the electrode is worn away during use of the plasma arc torch.

The torch also includes an electrically non-conductive wear stop fixedly mounted within the main torch body. The wear stop defines a first engaging surface that is axially spaced from the opposing surface of the nozzle by a predetermined axial distance D. One of the electrode and the nozzle is axially movable with respect to the other of the electrode and the nozzle, and the one of the electrode and nozzle that is axially movable defines a projection, which in turn defines a second engaging surface. Furthermore, the wear stop is positioned such that prior to any wear of the end face of the electrode, when the end face of the electrode is in electrical contact with the opposing surface of the nozzle, there is an axial clearance C between the first engaging surface of the wear stop and the second engaging surface of the projection. The clearance C thus decreases as the end face of the electrode is worn away during use of the plasma arc torch. In this way, as the clearance C decreases to zero, the first engaging surface of the wear stop abuts the second engaging surface of the projection so as to prevent the end face of the electrode from making electrical contact with the opposing surface of the nozzle when the wear exceeds a predetermined amount.

Thus, in some embodiments, the nozzle is fixed with respect to the main torch body and the electrode is axially movable relative to the main torch body, and the projection extends radially outwardly from an outer surface of the electrode. In other embodiments, the nozzle is axially movable relative to the main torch body and the electrode is fixed with respect to the body, and the projection extends from the nozzle.

In some cases, the plasma arc torch further includes a power source that is electrically connected to the electrode. The power source may be configured to apply a voltage differential between the electrode and the nozzle to initiate a pilot arc when the electrode is in electrical contact with the nozzle.

The plasma arc torch may further include a sensor configured to detect a state of an electrical circuit defined between the electrode and the nozzle when the voltage differential is applied. In some cases, the power source may include the sensor. Furthermore, the plasma arc torch may include an indicator in communication with the sensor. The indicator may be configured to provide an indication to a user of the state of the electrical circuit detected by the sensor. The indicator may be configured to notify a user when the state of the electrical circuit detected is an electrical discontinuity between the electrode and the nozzle.

In some cases, the length L corresponds to an approximate amount of time that the electrode is usable in the plasma arc torch before the wear stop engages the projection and prevents the end face of the electrode from making electrical contact with the opposing surface of the nozzle. The main torch body and the electrode holder may be configured such that the electrode holder is able to individually receive electrodes having different lengths L prior to any wear of the end face of the electrode. Accordingly, if desired, the torch manufacturer or parts distributor can provide electrodes of different nominal usage lives for installation in the torch.

In other embodiments, a method of detecting wear of an electrode in a plasma arc torch is provided, where the plasma arc torch includes a main torch body, an electrically conductive nozzle, an electrode holder arranged within the main torch body, and an electrode releasably attached to the electrode holder, where one of the electrode and the nozzle is axially movable with respect to the other of the electrode and the nozzle. The method includes the steps of providing a projection extending from the one of the electrode and the nozzle that is axially movable and providing an electrically non-conductive wear stop fixedly mounted within the main torch body. The wear stop is positioned such that the projection engages the wear stop only when an axial length L of the electrode is shorter than a predefined length due to a wearing away of the end face of the electrode during use of the plasma arc torch. A voltage differential is applied between the electrode and the nozzle, and a state of the electrical circuit defined between the electrode and the nozzle is detected when the voltage differential is applied.

In some cases, the detected state of the electrical circuit is indicated to a user. The state of the electrical circuit detected and indicated to the user may be an electrical discontinuity between the electrode and the nozzle.

Furthermore, the length L may correspond to an approximate amount of time that the electrode is usable in the plasma arc torch before the wear stop engages the projection and prevents the end face of the electrode from making electrical contact with the opposing surface of the nozzle.

In other embodiments, a plasma arc torch is provided that includes a main torch body, an electrically conductive nozzle that is fixed with respect to the main torch body, and an electrode holder arranged within the main torch body such that the electrode holder is axially movable relative to the main torch body. The torch further includes an electrode releasably attached to the electrode holder, where an end face of the electrode is configured to electrically contact an opposing surface of the nozzle when the electrode holder is moved towards the nozzle to initiate a pilot arc and the wear of the end face is less than a predetermined amount. The electrode defines an outer surface and a projection extending radially outwardly from the outer surface. Furthermore, the electrode has an axial length L defined between a forward-facing surface of the projection and the end face of the electrode.

In addition, the plasma arc torch includes an electrically non-conductive wear stop fixedly mounted in the main torch body. The wear stop is configured to engage the projection only when the length L is shorter than a predefined length due to the wear of the end face of the electrode during use of the plasma arc torch. Engagement of the wear stop with the electrode prevents the electrode from moving axially towards the nozzle, such that continued wearing away of the end face of the electrode prevents electrical contact between the end face and the nozzle and precludes initiation of the pilot arc.

In some cases, the plasma arc torch includes a power source electrically connected to the electrode. The power source may be configured to apply a voltage differential between the electrode and the nozzle to initiate the pilot arc when the electrode is in electrical contact with the nozzle.

The plasma arc torch may also include a sensor configured to detect a state of an electrical circuit defined between the electrode and the nozzle when the voltage differential is applied. In some cases, the power source includes the sensor. The plasma arc torch may also include an indicator in communication with the sensor, where the indicator is configured to provide an indication to a user of the state of the electrical circuit detected by the sensor. The indicator may be configured to notify a user when the state of the electrical circuit detected is an electrical discontinuity between the electrode and the nozzle.

In some cases, the length L corresponds to an approximate amount of time the electrode is usable in the plasma arc torch before the wear stop engages the projection and prevents the end face of the electrode from making electrical contact with the opposing surface of the nozzle. The main torch body and the electrode holder may be configured such that the electrode holder is able to individually receive electrodes having different lengths L prior to any wear of the end face of the electrode.

In other embodiments, a plasma arc torch is provided that includes a main torch body and an electrically conductive nozzle that is axially movable relative to the main torch body, where the nozzle defines a projection. The torch further includes an electrode holder fixedly mounted within the main torch body and an electrode releasably attached to the electrode holder. An end face of the electrode is configured to electrically contact an opposing surface of the nozzle when the nozzle is moved towards the electrode to initiate a pilot arc and the wear of the end face is less than a predetermined amount. The torch also includes an electrically non-conductive wear stop fixedly mounted within the main torch body. The wear stop is configured to engage the projection only when the end face of the electrode has experienced a predetermined amount of wear during use of the plasma arc torch. Thus, engagement of the wear stop with the projection prevents the nozzle from moving axially towards the electrode, such that continued wearing away of the end face of the electrode prevents electrical contact between the end face and the nozzle and precludes initiation of the pilot arc.

The plasma arc torch may further include a power source electrically connected to the electrode and a sensor. The power source may be configured to apply a voltage differential between the electrode and the nozzle to initiate the pilot arc when the electrode is in electrical contact with the nozzle. The sensor may be configured to detect a state of an electrical circuit defined between the electrode and the nozzle when the voltage differential is applied.

In other embodiments, an electrode for use in a blow-back type plasma arc torch is provided. The electrode is configured to be axially movable with respect to a nozzle of the plasma arc torch and to initiate a pilot arc within the plasma arc torch. The electrode defines an end face, an axial length L, and an outer surface, and the electrode further defines a projection extending radially outwardly from the outer surface. The projection is configured to engage a non-conductive wear stop disposed within the plasma arc torch when the length L is shorter than a predefined length due to wear of the end face during use of the plasma arc torch, such that engagement of the projection with the wear stop prevents the electrode from moving axially towards the nozzle and continued wear of the end face precludes initiation of the pilot arc.

In some cases, the electrode includes an electrode blank that defines a bore at one end and an emissive element configured to fit within the bore such that the end face of the electrode includes part of the electrode blank and part of the emissive element.

Therefore, as described below in greater detail, a plasma arc torch and method are provided for allowing a user to detect the wear on an electrode.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
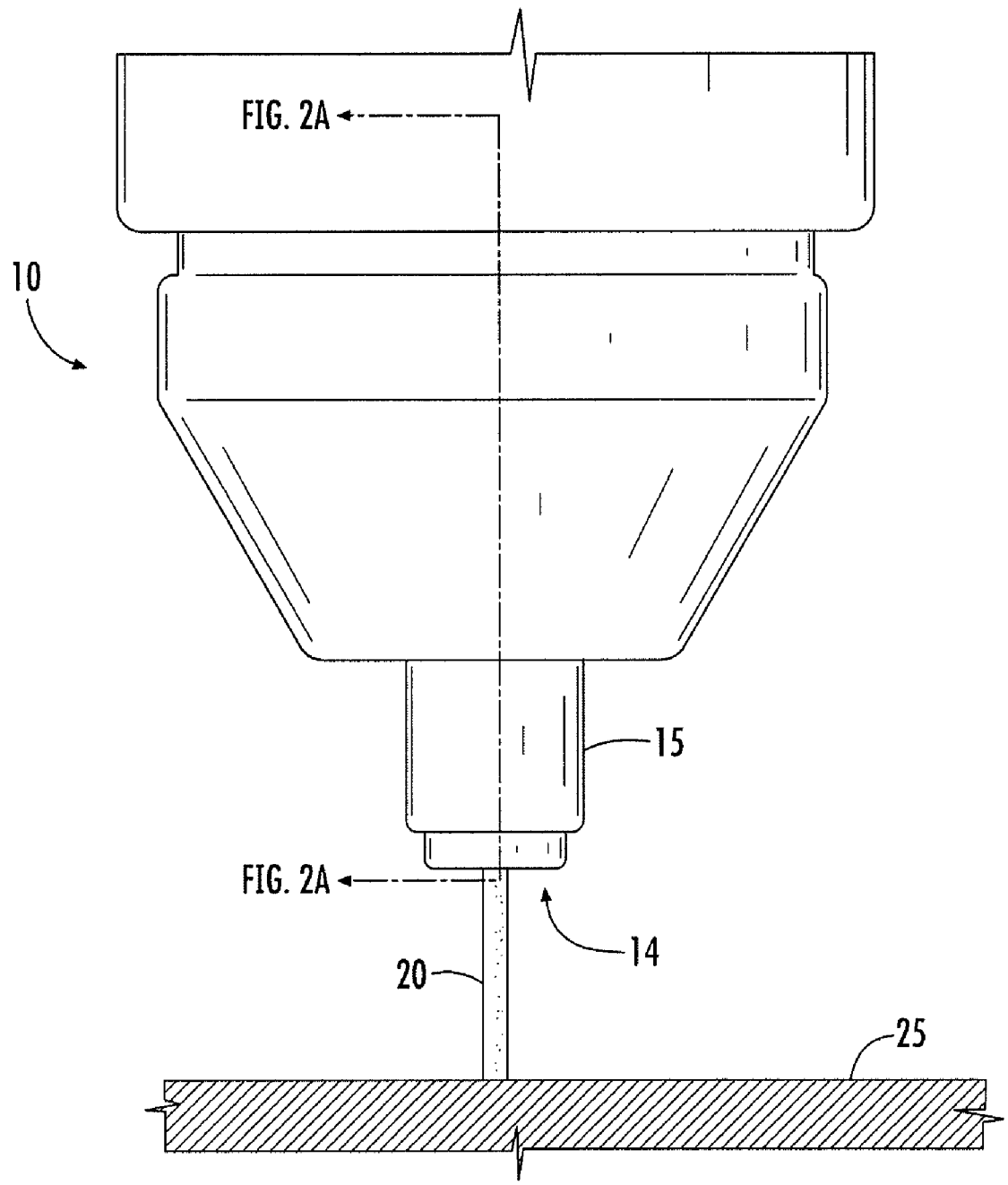
FIG. 1 is a schematic representation of a plasma torch performing a torch operation on a work piece according to an exemplary embodiment of the present invention.

Embodiments of the present invention now will be described more fully hereinafter with reference to the accompanying drawings, in which some but not all embodiments are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 2:
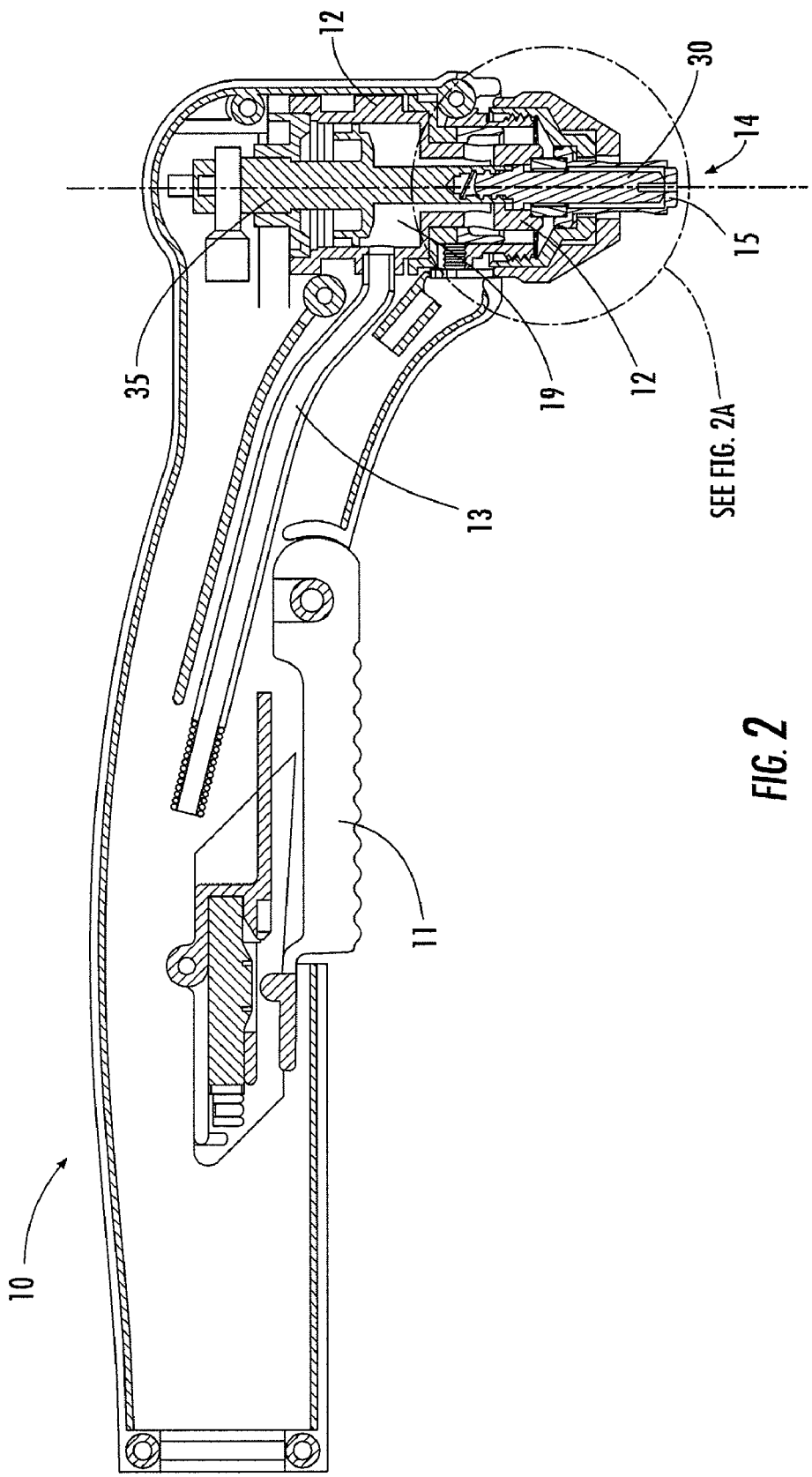
FIG. 2 is a cross-sectional view of a blow-back type plasma torch according to an exemplary embodiment of the present invention.

A blow-back type plasma torch 10 in accordance with embodiments of the present invention is shown in FIGS. 1 and 2. The torch 10 includes a main torch body 12 and an electrically conductive nozzle 15 fixed with respect to the body 12 at an operational end 14 of the torch 10. As described in greater detail below, the nozzle 15 is configured to direct a high velocity stream of plasma gas 20 towards a work piece 25 that is to be cut or marked. In this way, an electric arc that is initiated within the torch 10 may be conducted by the plasma gas 20 to the work piece 25, heating the work piece and melting the metal to form the cut or mark.

Figure 2A:
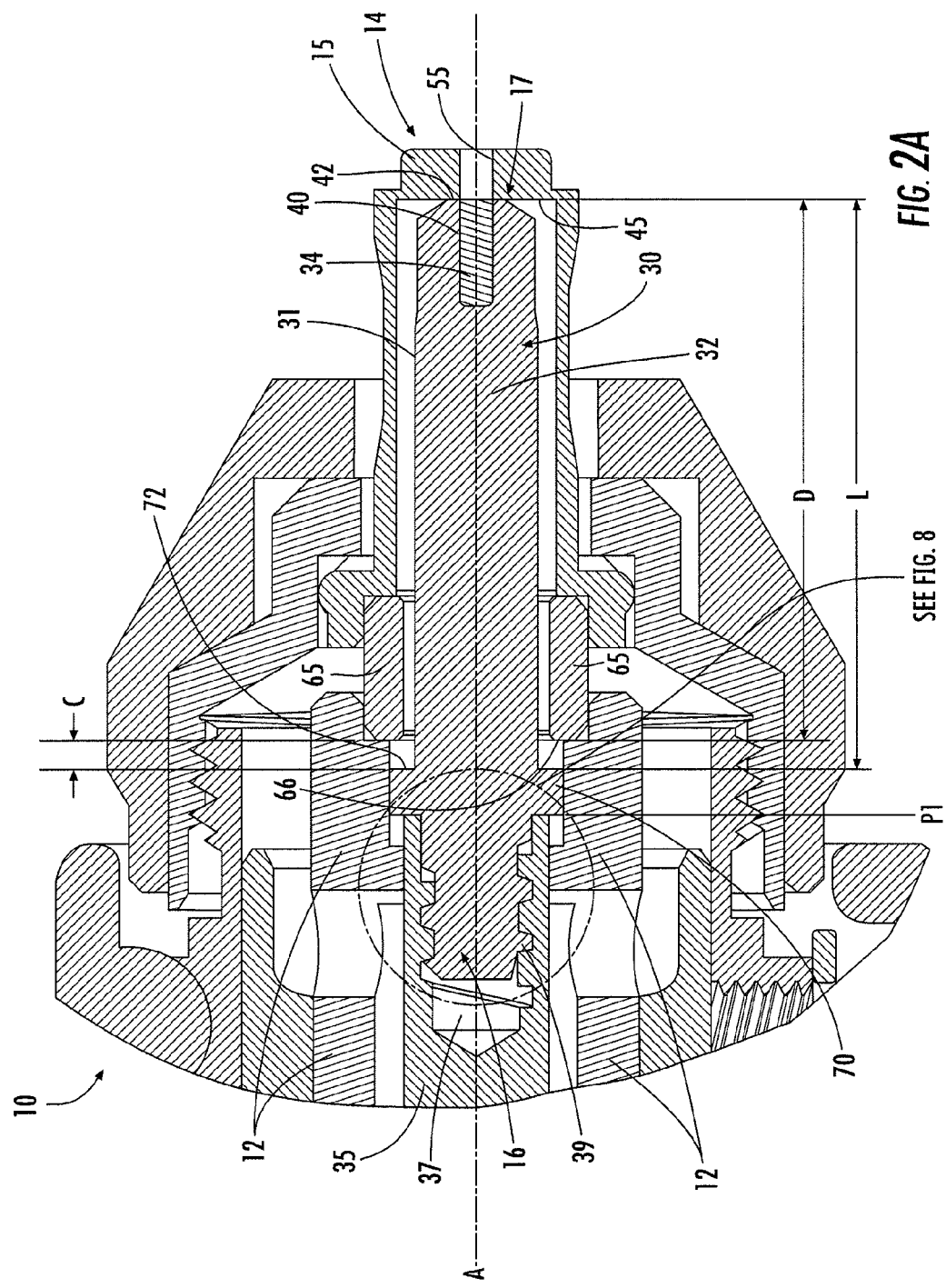
FIG. 2A is a detail view of FIG. 2 along line 2A-2A of FIG. 1 showing the electrode of the plasma torch prior to any wear of the electrode, with the electrode in an extended position.

Turning to FIG. 2A, the plasma torch 10 includes an electrode 30 that is releasably attached to an electrode holder 35. For example, the electrode holder 35 may define an internally threaded bore 37 that is configured to receive external threads 39 formed on the outer surface 31 of the electrode 30 at a distal end 16 of the electrode (i.e., the end of the electrode farthest from the operational end 14 of the torch 10). Thus, a spent electrode can be removed and replaced with a new electrode as needed.

The electrode 30 may comprise an electrode blank 32 and an emissive element 34. The electrode blank 32 may be made of an erodible material, such as copper, a copper alloy, silver, or a silver alloy. Furthermore, the electrode blank 32 may define a bore 40 at the proximal end 17 of the electrode (i.e., the end of the electrode closest to the operational end 14 of the torch). The bore 40 may be configured to receive the emissive element 34, which may be made of an erodible material, such as hafnium, a hafnium alloy, zirconium, a zirconium alloy, or other material known in the art and having suitable characteristic. In some cases, the emissive element 34 may be in the form of a circular rod and may be press fit, brazed, or otherwise embedded into the bore 40 of the blank 32. The emissive element 34 and the blank 32 may be concentrically disposed to form an end face 42 at the proximal end 17 of the electrode 30 that includes both the emissive element 34 and the blank 32.

The electrode holder 35 is arranged within the main torch body 12 such that the electrode holder 35 is axially movable relative to the body 12. The electrode 30 can be releasably attached to the electrode holder 35 such that the electrode projects from the electrode holder in a forward direction (i.e., in the direction of the operational end 14 of the torch 10) towards an opposing surface 45 of the nozzle 15. For example, in FIG. 2A, the electrode holder 35 is movable along the A axis. Thus, when the electrode blank 32 is attached to the electrode holder 35, as shown, axial movement of the electrode holder 35 causes the electrode 30 to move towards or away from the operational end 14 of the torch 10.

In this regard, prior to the start of a torch operation, the electrode holder 35 and the electrode 30 are typically biased towards the nozzle 15, for example by a spring (not shown), such that the electrode 30 is in an extended position. In the extended position (shown in FIG. 2A), the end face 42 of the electrode 30 makes electrical contact with the opposing surface 45 of the nozzle 15. Referring to FIG. 2, upon actuation of a trigger 11, a power source (not shown) can be used to apply a voltage differential between the electrode 30 and the nozzle 15, causing current to flow between the two. At substantially the same time, a plasma gas, such as air, is allowed to flow through a duct 13 into a first chamber 19, where the force of the gas overcomes the bias of the electrode holder 35 and moves the electrode holder 35 and the electrode 30 away from the nozzle 15.

Figure 2B:
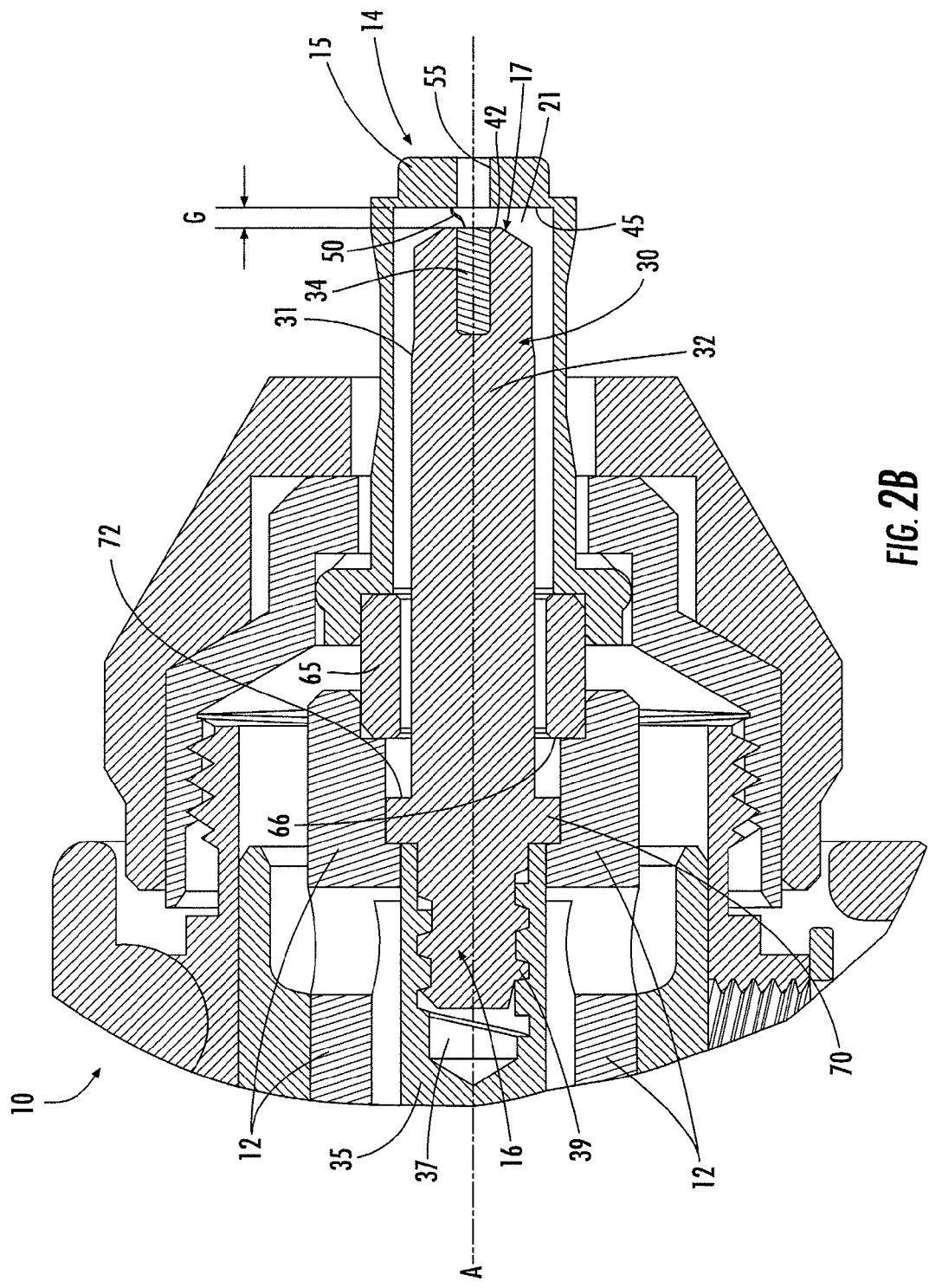
FIG. 2B is a view similar to FIG. 2A showing the electrode prior to any wear of the electrode, with the electrode in a retracted position.

As the electrode holder 35 is moved in a direction away from the operational end 14 to a retracted position, shown in FIG. 2B, a gap G is created between the end face 42 of the electrode 30 and the opposing surface 45 of the nozzle 15, and a pilot arc 50 may be established across the gap G, between the nozzle 15 and the electrode 30. More specifically, the pilot arc 50 may extend from the emissive element 34 to the opposing surface 45 of the nozzle 15, as shown in FIG. 2B.

The gas flows through a series of pathways in the main torch body 12 from the first chamber 19 to a second chamber 21 (i.e., the volume created by the gap G between the electrode 30 and the nozzle 15, shown in FIG. 2B). The nozzle 15 defines an orifice 55 for gas flow therethrough towards the work piece. Thus, the plasma gas "blows" the arc out through the nozzle orifice 55 so that the arc can attach to the work piece. The power source may be configured to sense the change in impedance as the arc transfers from the nozzle to the work piece and, as a result, may disconnect from the nozzle and connect to the work piece. At this point, the power supply may also be designed to adjust the current flowing to the work piece to an operational level for cutting.

Figure 3:
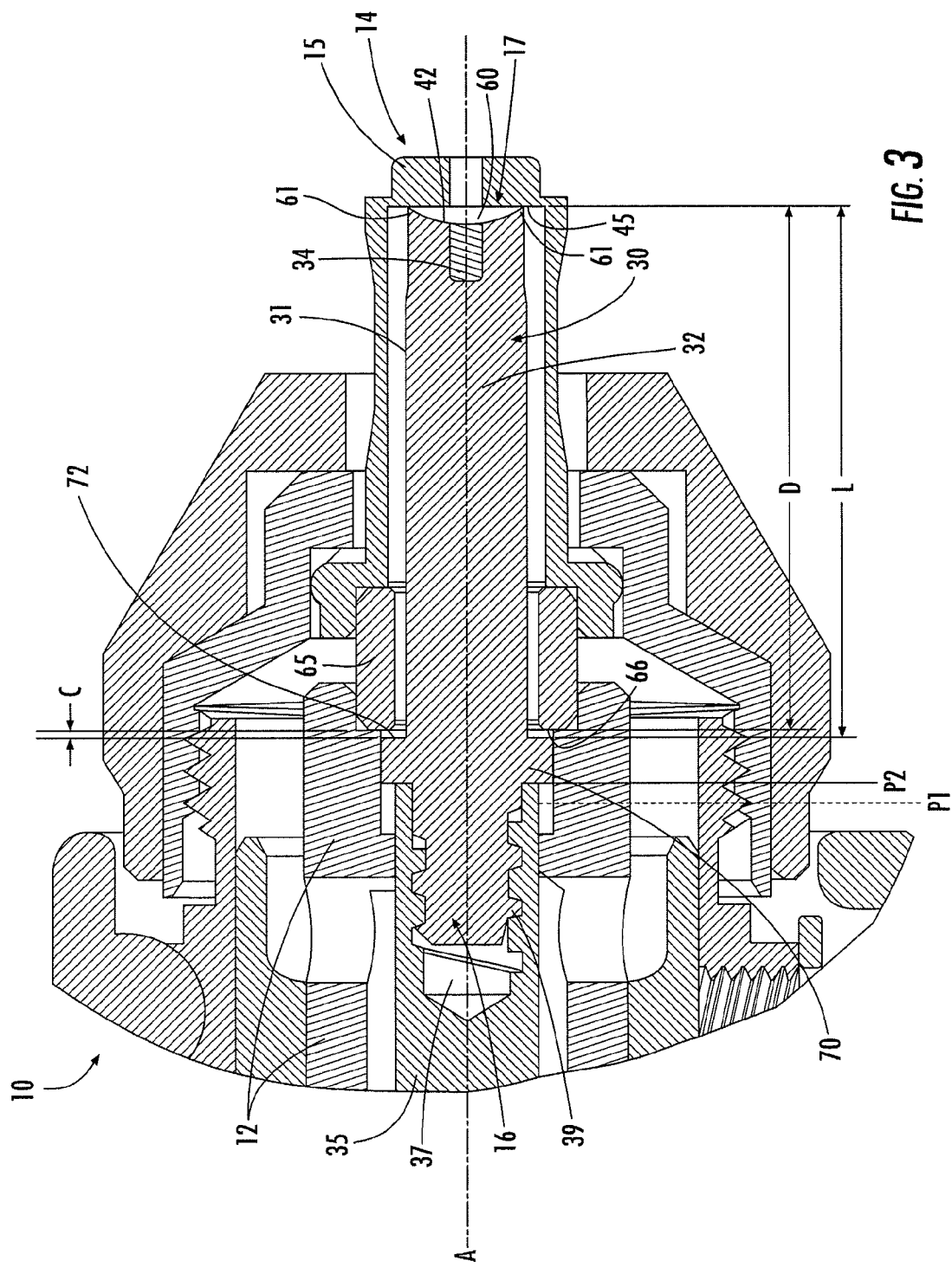
FIG. 3 is a view similar to FIG. 2A showing some wear of the electrode (the electrode projection not engaging the wear stop)
Figure 4:
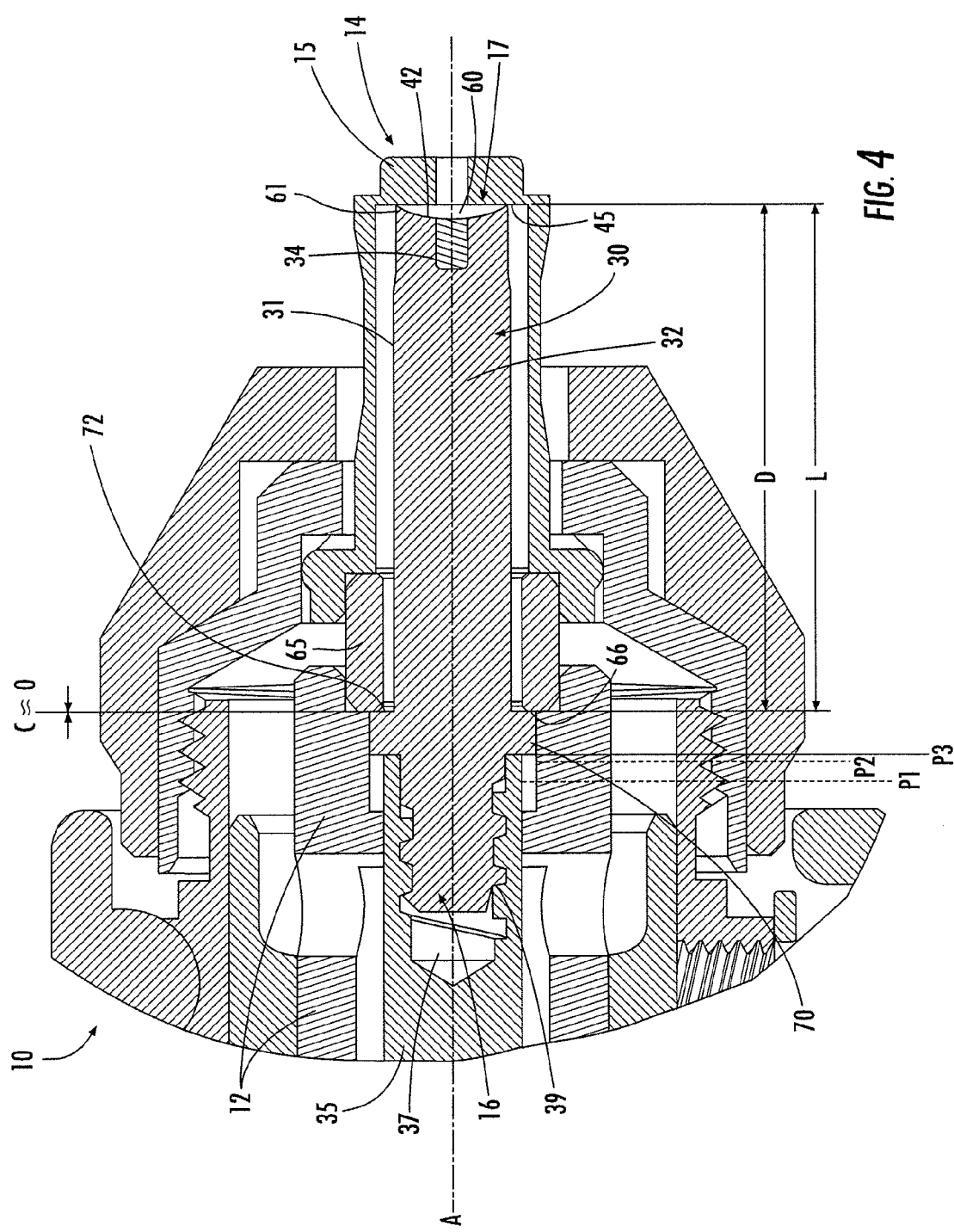
FIG. 4 is a view similar to FIG. 2A showing additional wear of the electrode as compared to FIG. 3 (the electrode projection engaging the wear stop)
Figure 5:
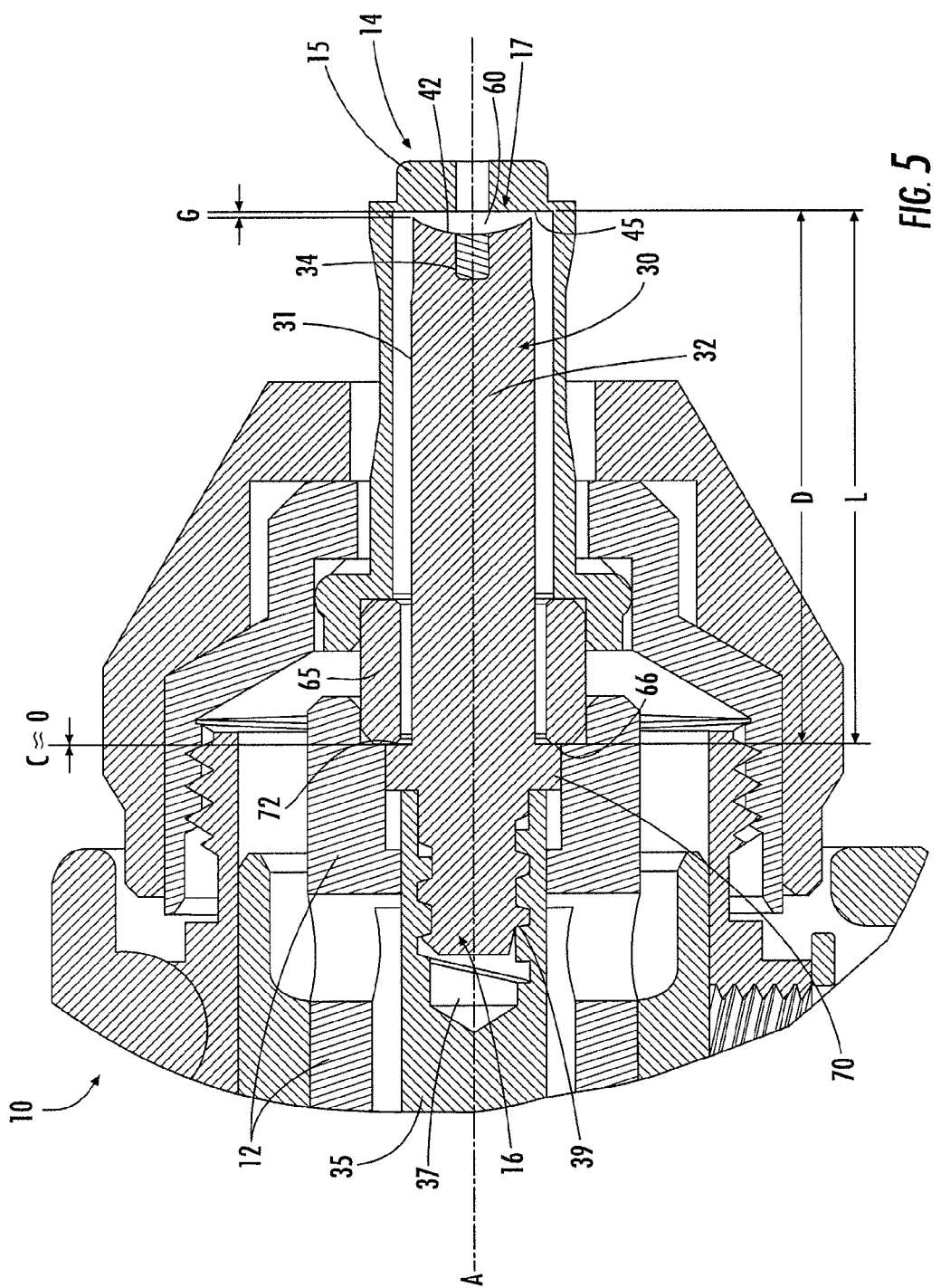
FIG. 5 is a view similar to FIG. 2A showing excessive wear of the electrode (the electrode projection engaging the wear stop, the electrode no longer able to electrically contact the nozzle)

As the torch operation progresses, the face 42 of the electrode 30 may erode and form a cavity 60, as illustrated in FIGS. 3-5. Erosion of the electrode 30 may result in overheating of portions of the blank 32 that extend past the emissive element 34 towards the operational end 14 of the torch 10 (e.g., portions 61), which may cause cracks in the blank 32 as well as double-arcing, as described in U.S. Pat. No. 6,191,381, the contents of which are incorporated by reference herein. Thus, the nozzle 15 and/or the electrode 30 may experience significant damage. As a result, it is often necessary for a user to replace the electrode 30 more frequently than actually necessary in order to avoid catastrophic failure.

Figure 6:
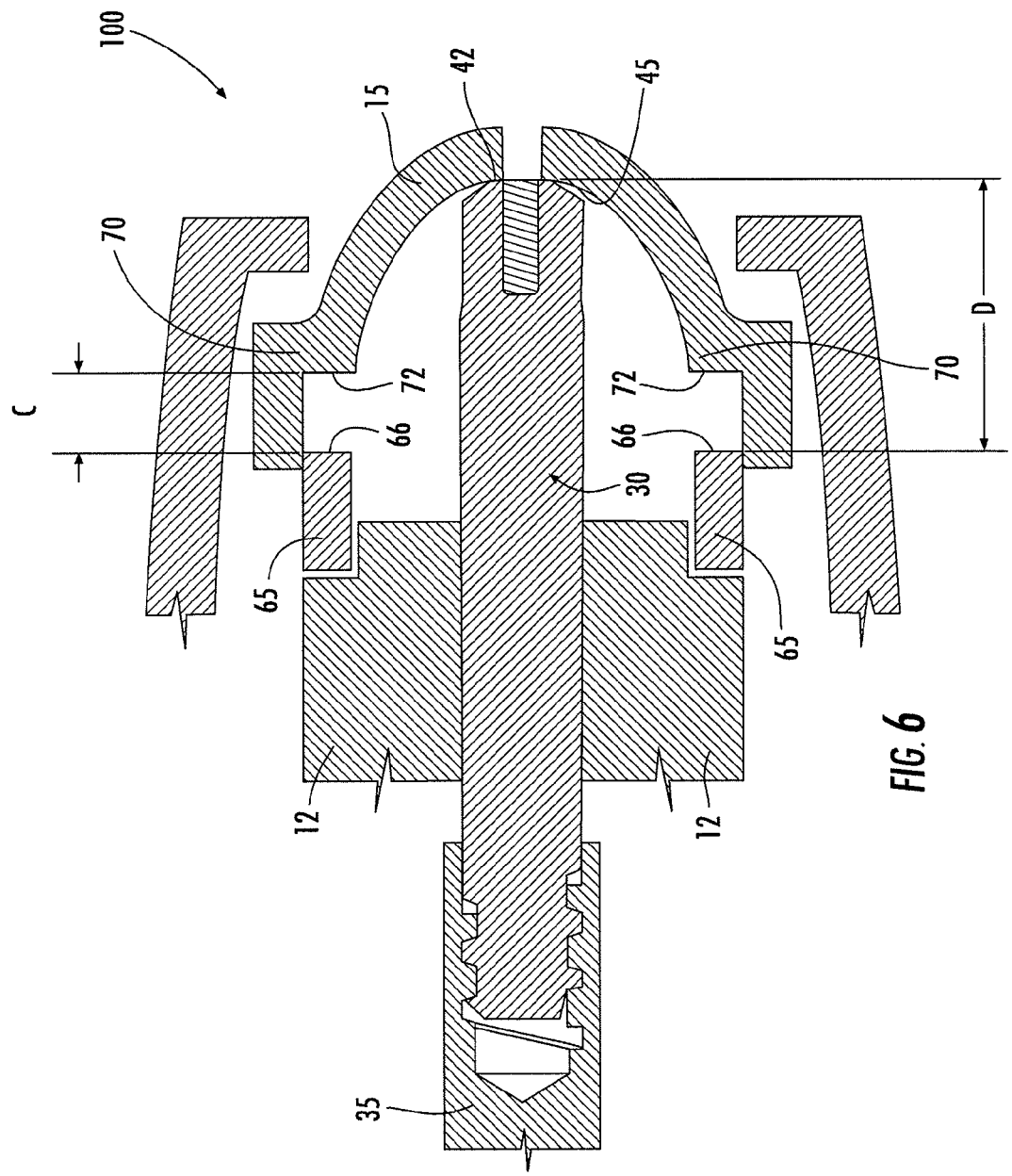
FIG. 6 is a cross-sectional view of a blow-forward type plasma torch according to another exemplary embodiment of the present invention.

In a blow-forward type plasma arc torch, such as the torch 100 shown in FIG. 6, the nozzle 15 is axially movable relative to the main torch body 12, and the electrode holder 35 and the electrode 30 are fixed with respect to the body 12. Thus, to initiate a torch operation, the nozzle 15 is initially in contact with the end face 42 of the electrode 30, such as via a spring (not shown), and upon application of a voltage differential between the electrode 30 and the nozzle 15, the flow of plasma gas causes the nozzle 15 to move away from the electrode 30 to establish the gap and initiate the pilot arc across the gap.

Embodiments of the plasma torch 10, 100 described herein can thus be used to achieve maximum use of the electrode 30 while at the same time detecting when the electrode has experienced excessive wear so that the electrode can be replaced prior to failure. In this regard, the blow-back type plasma torch 10 includes an electrically non-conductive wear stop 65 configured to limit the movement of the electrode 30 in the forward direction when the proximal end 17 of the electrode has experienced a certain amount of wear. Similarly, the blow-forward type plasma arc torch 100 includes an electrically non-conductive wear stop 65 configured to limit the movement of the nozzle 15 in the rearward direction when the electrode is sufficiently worn. Thus, although much of the description below refers to a blow-back type plasma arc torch, such as the torch 10 shown in FIGS. 2-5, embodiments are applicable to a blow-forward type plasma arc torch, such as the torch 100 shown in FIG. 6, as described below.

Referring again to the blow-back type plasma arc torch of FIG. 2A, the electrode 30 may define a projection 70 extending radially outwardly from the outer surface 31. The projection 70 may extend around a portion of or the entire circumference of the electrode 30, or the projection may consist of multiple tabs or extensions that accomplish the same results described below.

The electrode 30 defines an axial length L. For example, in FIG. 2A, the length L is defined between a forward-facing surface 72 of the projection 70 and the end face 42 of the electrode 30. As the end face 42 of the electrode 30 is worn away during use of the plasma arc torch 10, as described above, the length L will decrease. Thus, to initiate each subsequent torch operation, it is necessary for the electrode holder 35 to move to a more forward position than was required for starting the previous torch operation in order to achieve the required electrical contact between the end face 42 of the electrode 30 and the opposing face 45 of the nozzle 15 for initiating the pilot arc.

FIGS. 2A, 3, and 4, for example, illustrate how the "contact position" (i.e., the position of the electrode 30 with respect to the main torch body 12 when the end face 42 is in contact with the opposing surface 45 of the nozzle 15) shifts closer to the operational end 14 of the torch 10 as the electrode 30 experiences progressively more wear. In FIG. 2A, for example, the electrode 30 has experienced relatively little wear, and the relative contact position of the electrode 30 is indicated by reference point P1. In FIGS. 3 and 4, which illustrate subsequent torch operations, the electrode 30 has experienced progressively more wear, and the relative contact positions of the electrode 30 are indicated by reference points P2 and P3, respectively. Thus, as demonstrated by the figures, due to the decreased length L of the electrode 30 in FIG. 4, the reference point P3 is closer to the operational end 14 of the torch 10 than reference points P1 and P2 marking previous contact positions.

Referring to FIGS. 2A and 3-5, the wear stop 65 is fixedly mounted within the main torch body 12 and defines a first engaging surface 66 (e.g., the rear-facing surface) that is axially spaced from the opposing surface 45 of the nozzle 15 by a predetermined distance D. In this regard, the wear stop 65 may be made of any non-conductive material, such as a high-temperature plastic or ceramic material, and may have an annular shape that surrounds a portion of the electrode 30 that is closer to the end face 42 with respect to the projection 70. The inner diameter of the wear stop 65 may be larger than the diameter of the surrounded portion of the electrode 30 so as to provide space between the outer surface 31 of the electrode 30 and the wear stop 65 and allow unrestricted axial movement of the electrode 30 when the projection 70 and the wear stop 65 are not engaged. At the same time, the inner diameter of the wear stop 65 may be smaller than the diameter of the electrode 30 measured at the location of the projection 70, so as to abut the projection 70 when the projection and the wear stop are engaged. Alternatively, the wear stop 65 may comprise one or more non-conductive portions in surrounding relationship to the electrode 30, but not extending around the entire circumference of the electrode 30, such that the wear stop portions interact with the projection 70 of the electrode 30 as described below.

In some cases, the wear stop 65 may be part of the torch main body 12 or may otherwise interact with the main torch body to facilitate the initiation of a torch operation. For example, the wear stop 65 may be a swirl baffle that includes pathways for allowing the plasma gas to flow from the first chamber 19 to the second chamber 21. The swirl baffle may, for example, be used to focus the gas flow and cause the gas to enter the second chamber 21 in "swirls" to restrain the arc from diverging from the nozzle and/or the work piece (e.g., creating a gas "sheath" around the arc).

In any case, the wear stop 65 is positioned such that the electrode length L exceeds the distance D prior to any wear of the end face 42 of the electrode 30, as shown, for example, in FIG. 2A. When the end face 42 of the electrode 30 is in electrical contact with the opposing surface 45 of the nozzle 15, an axial clearance C is defined between the first engaging surface 66 (e.g., the rear-facing surface) of the wear stop 65 and a second engaging surface 72 (e.g., the forward-facing surface of the projection). Thus, as the end face 42 of the electrode 30 is worn away during use of the plasma arc torch 10, the clearance C decreases, as shown in FIGS. 2A, 3, and 4.

Referring to FIG. 4, when the clearance C decreases to approximately zero (i.e., there is negligible clearance), the second engaging surface 72 of the projection 70 abuts the first engaging surface 66 of the wear stop 65. At this point, the length L of the electrode 30 may be sufficient to achieve contact between the end face 42 and the opposing surface 45 of the nozzle 15, as seen in FIG. 4. Upon additional wear of the electrode 30, however, the wear stop 65 prevents the end face 42 of the electrode 30 from making electrical contact with the opposing surface 45 of the nozzle 15, as shown in FIG. 5. In other words, once the wear stop 65 engages the projection 70, the engagement of the wear stop 65 with the electrode 30 prevents the electrode 30 from moving axially towards the nozzle 15 (e.g., to compensate for the decreased electrode length L). Thus, as shown in FIG. 5, continued wearing away of the end face 42 of the electrode 30 once the projection 70 has engaged the wear stop 65 prevents electrical contact between the end face 42 and the nozzle 15 and precludes initiation of the pilot arc 50. As a result, electrical contact of the electrode 30 and the nozzle 15 can only occur when the wear of the end face 42 is less than a predetermined amount, thereby preventing the initiation of a pilot arc 50 when the electrode 30 has experienced a certain amount of wear.

As mentioned above, aspects of the previously described embodiments are also applicable in blow-forward type plasma arc torches 100, as shown in FIG. 6. In FIG. 6, the wear stop 65 is fixedly mounted within the main torch body 12 and defines a first engaging surface 66 (in this case, the forward-facing surface of the wear stop) that is axially spaced from the opposing surface 45 of the nozzle 15 by a predetermined distance D. In this case, the projection 70 is defined by the nozzle 15. For example, the projection 70 may be a radial extension of the nozzle that is configured to move into engagement with the wear stop 65 as the end face 42 of the electrode is worn away. As such, once the clearance C defined between the first engaging surface 66 of the wear stop and the second engaging surface 72 of the projection 70 (in this case, the rear-facing surface of the projection) decreases to approximately zero, the opposing surface 45 of the nozzle 15 is no longer able to contact the end face 42 of the electrode 30 as the electrode experiences further wear, as described above with reference to the blow-back type plasma arc torch 10 of FIG. 2A.

Figure 7:
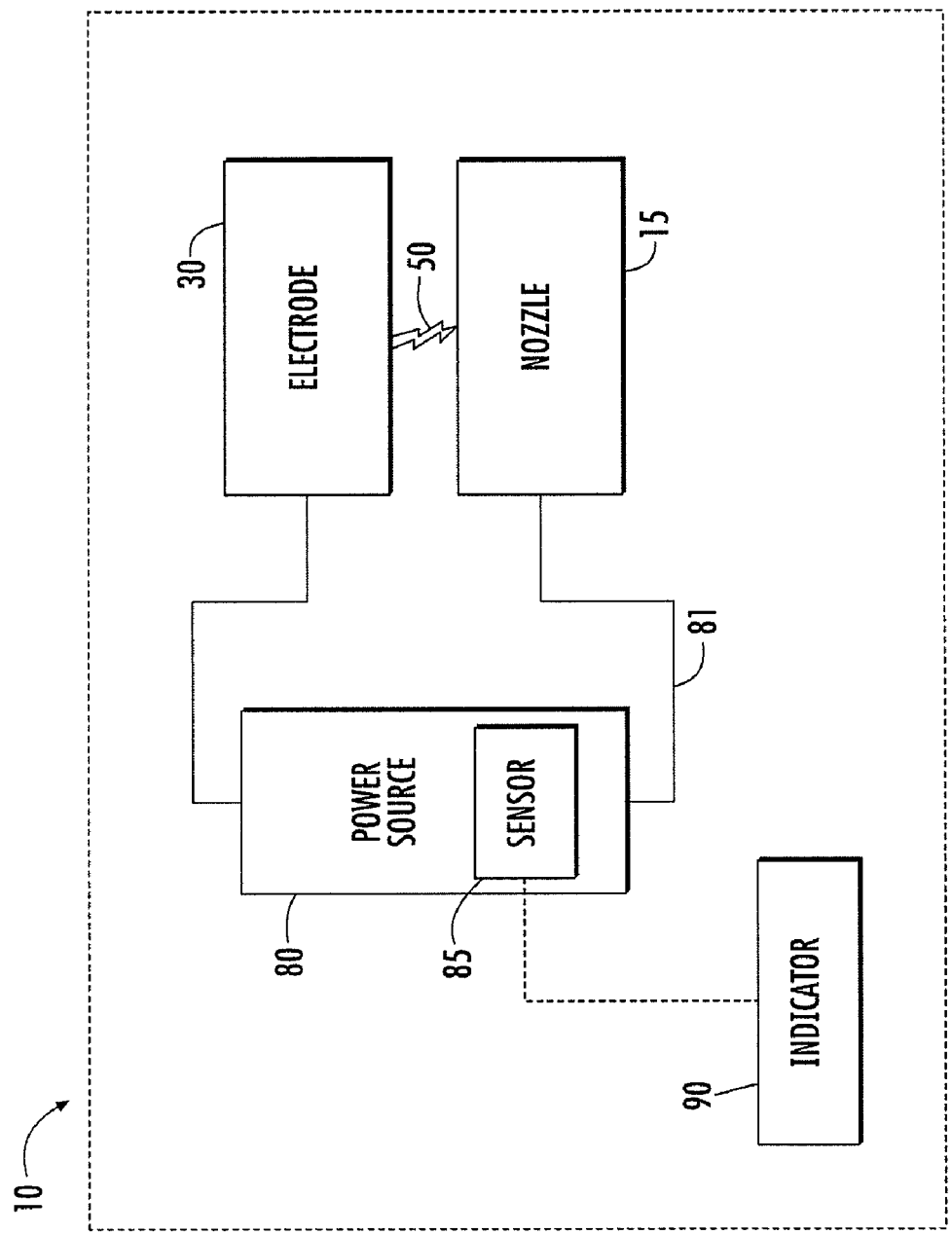
FIG. 7 is a schematic representation of a plasma torch including a power source, sensor, and indicator according to another exemplary embodiment of the present invention.

In either type of plasma arc torch 10, 100, in some embodiments, the plasma arc torch 10, 100 includes a power source 80 that is electrically connected to the electrode 30, as illustrated in FIG. 7. The power source 80 may be configured to apply a voltage differential between the electrode 30 and the nozzle 15 to initiate the pilot arc 50 when the electrode 30 is in electrical contact with the nozzle 15, as described above. In other words, when the end face 42 of the electrode 30 is in contact with the opposing surface 45 of the nozzle 15, an electrical circuit 81 is completed, and the application of a voltage differential between the electrode 30 and the nozzle 15 causes an electrical current to flow between the two conductors. Thus, as the electrode 30 is moved away from the nozzle 15, e.g., as shown in FIG. 2B, the current flow establishes the pilot arc 50 across the gap G formed between the two conductors.

Thus, in some embodiments, the torch 10, 100 may further include a sensor 85 configured to detect a state of the electrical circuit 81 defined between the electrode 30 and the nozzle 15 when the voltage differential is applied. The sensor 85 may be included on or within the power source 80, as shown in FIG. 7. Alternatively, the sensor 85 may be physically separate and distinct from the power source 80, but may be in communication with the power source 80 or another portion of the circuit 81.

In this way, the sensor 85 may detect the electrical state of the circuit 81 defined by the power source 80, the electrode 30, and the nozzle 15. For example, when the voltage differential is applied to the circuit 81 and current is flowing, the sensor 85 may detect a complete circuit. On the other hand, if a voltage differential is applied to the electrode 30 and the nozzle 15 but there is no current flow, the sensor 85 may detect a state of electrical discontinuity between the sensor 85 and the nozzle 15 and/or other portions of the electrical circuit 81.

The plasma arc torch 10, 100 may further include an indicator 90 in communication with the sensor 85. The indicator 90 may be configured to provide an indication to the user of the state of the electrical circuit 81 detected by the sensor 85. The indicator 90 may be, for example, a visual indicator, such as a light or LED that lights up when an electrical discontinuity is detected. Thus, when the user sees the light of the indicator come on, the user would know that a fault condition exists. In some cases, the indicator 90 may be an audible indicator, such as a beep or a tone that sounds when an electrical discontinuity is detected, or the indicator 90 may be any other type of indication or combination of indications that convey to the user the state of the electrical circuit. The indicator 90 may be part of the torch 10, 100 as shown in FIG. 7, such as a light that is included on the torch, or the indicator 90 may be located remotely from the torch 10, 100, such as on an indicator panel or on a separate device accessible to the user.

Thus, if the electrode 30 is not in contact with the nozzle 15 when the voltage differential is first applied, the gap G (e.g., shown in FIG. 5) will act as a break in the circuit 81, and current will be unable to flow through the circuit 81. As shown in FIG. 5, the wearing away of the end face 42 of the electrode 30 to the extent that the axial length L becomes shorter than the distance D would create a situation in which the wear stop 65 prevents the end face 42 from contacting the opposing surface 45 of the nozzle 15. In this case, the sensor 85 may detect the electrical discontinuity when a voltage differential is applied, and the sensor 85 may send a signal to the indicator 90 to cause the indicator 90 to indicate the state of the electrical circuit 81 to the user, such as by turning on an indicating light. The light or other indication would thus convey to the user that the electrode 30 is possibly worn to the extent that further use may cause damage to the torch 10, 100 or work piece. The user would then replace the electrode 30. In a case where replacing the electrode 30 does not return the torch to an operational state, the user may choose to perform other diagnostics to determine the cause of the electrical discontinuity.

In some embodiments of the blow-back type plasma arc torch, the length L of the electrode 30 corresponds to an approximate amount of time the electrode is usable in the plasma arc torch 10, 100 before the wear stop 65 engages the projection 70 and prevents the end face 42 of the electrode 30 from making electrical contact with the opposing surface 45 of the electrode. In other words, based on the materials from which the electrode 30 is made and the expected rate of wear at the level of current used for operating the particular arc torch 10, 100 the electrode 30 may be expected to last a certain amount of time when used. For example, a particular type of electrode having a length L1 may be expected to last for 60 minutes of continuous use under certain conditions (e.g., operating at a certain level of current flow). Another electrode made of the same material but having a length L2 that is longer than L1 may be expected to last for 90 minutes of use under similar conditions.

The plasma arc torch 10, 100 may thus be configured to receive different sizes of electrodes 30, allowing the user to choose an electrode having an expected duration that is appropriate for the given torch operation. In this regard, referring to FIGS. 2A and 6, the main torch body 12 and the electrode holder 35 may be configured (i.e., sized and shaped) to individually receive electrodes 30 having different lengths L prior to any wear of the end face 42 of the electrode 30.

Figure 8:
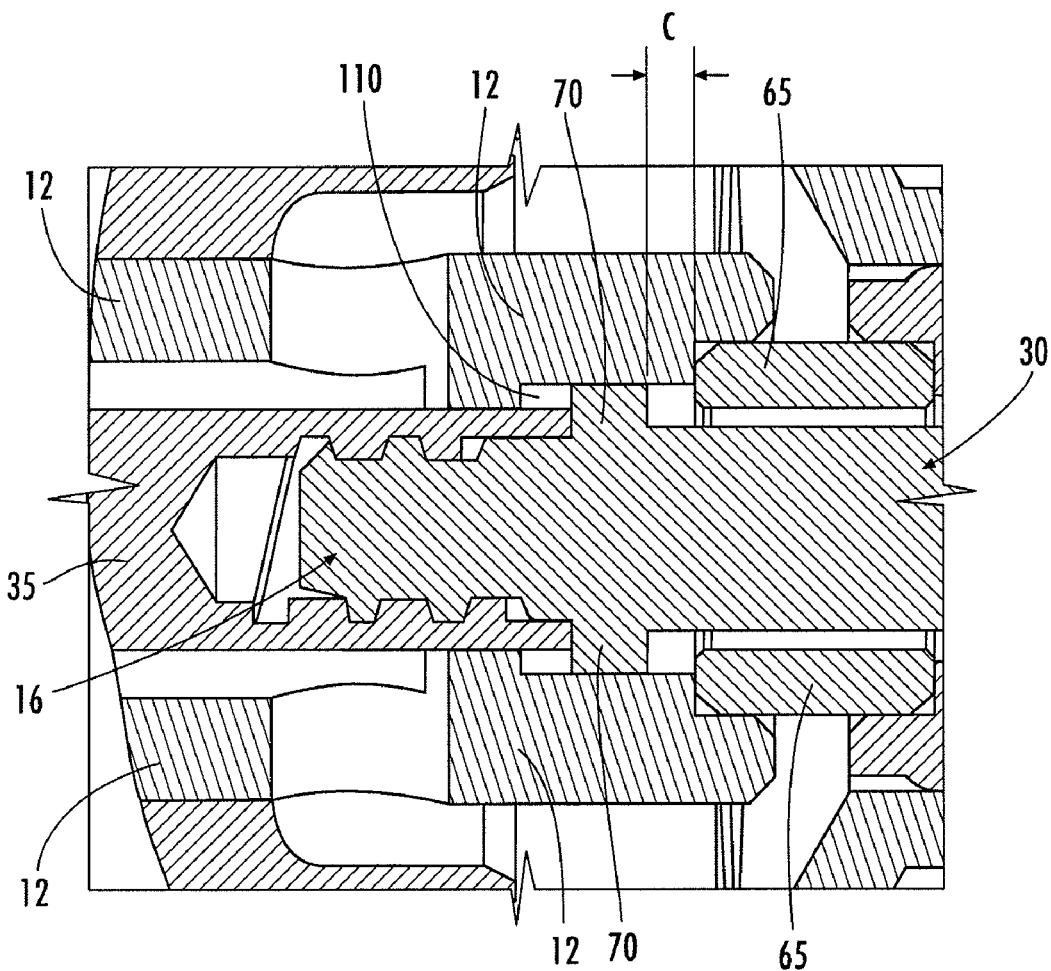
FIG. 8 is a detail cross-sectional view of the electrode holder of the plasma torch of FIG. 1.

Turning to FIG. 8, for example, the main torch body 12 may be configured to allow for different dimensions for the axial clearance C defined between the forward-facing surface 72 of the projection 70 and the rear-facing surface 66 of the wear stop 65 prior to any wear on the electrode 30, depending on the length L of the electrode 30. Thus, an electrode 30 having a shorter length L1 prior to any wear would result in a smaller clearance C (and a shorter nominal usage time) as compared to an electrode with a longer length L2 prior to any wear; however, the main torch body 12 may be configured to receive both sizes of electrodes. As a result, the user has the option of choosing an electrode that has an expected duration that is suitable for the particular torch operation to be performed.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A plasma arc torch comprising:
 a main torch body;
 an electrically conductive nozzle defining an orifice for gas flow therethrough towards a work piece;
 an electrode holder arranged within the main torch body;
 an electrode releasably attached to the electrode holder and projecting from the electrode holder in a forward direction towards an opposing surface of the nozzle, the electrode defining an end face and an axial length L, the length L decreasing as the end face of the electrode is worn away during use of the plasma arc torch; and
 an electrically non-conductive wear stop fixedly mounted within the main torch body, the wear stop defining a first engaging surface that is axially spaced from the opposing surface of the nozzle by a predetermined axial distance D,
 wherein one of the electrode and the nozzle is axially movable with respect to the other of the electrode and the nozzle, and wherein the one of the electrode and nozzle that is axially movable defines a projection, wherein the projection defines a second engaging surface,
 wherein the wear stop is positioned such that prior to any wear of the end face of the electrode, when the end face of the electrode is in electrical contact with the opposing surface of the nozzle, there is an axial clearance C between the first engaging surface of the wear stop and the second engaging surface of the projection, the clearance C decreasing as the end face of the electrode is worn away during use of the plasma arc torch, and
 wherein the clearance C decreases to zero and the first engaging surface of the wear stop abuts the second engaging surface of the projection so as to prevent the end face of the electrode from making electrical contact with the opposing surface of the nozzle when the wear exceeds a predetermined amount.

2. The plasma arc torch of claim 1, wherein the nozzle is fixed with respect to the main torch body and the electrode is axially movable relative to the main torch body, and wherein the projection extends radially outwardly from an outer surface of the electrode.

3. The plasma arc torch of claim 1, wherein the nozzle is axially movable relative to the main torch body and the electrode is fixed with respect to the body, and wherein the projection extends from the nozzle.

4. The plasma arc torch of claim 1 further comprising a power source electrically connected to the electrode, wherein the power source is configured to apply a voltage differential between the electrode and the nozzle to initiate a pilot arc when the electrode is in electrical contact with the nozzle.

5. The plasma arc torch of claim 4 further comprising a sensor configured to detect a state of an electrical circuit defined between the electrode and the nozzle when the voltage differential is applied.

6. The plasma arc torch of claim 5, wherein the power source includes the sensor.

7. The plasma arc torch of claim 5 further comprising an indicator in communication with the sensor, wherein the indicator is configured to provide an indication to a user of the state of the electrical circuit detected by the sensor.

8. The plasma arc torch of claim 7, wherein the indicator is configured to notify a user when the state of the electrical circuit detected is an electrical discontinuity between the electrode and the nozzle.

9. The plasma arc torch of claim 1, wherein the length L corresponds to an approximate amount of time the electrode is usable in the plasma arc torch before the wear stop engages the projection and prevents the end face of the electrode from making electrical contact with the opposing surface of the nozzle.

10. The plasma arc torch of claim 1, wherein the main torch body and the electrode holder are configured such that the electrode holder is able to individually receive electrodes having different lengths L prior to any wear of the end face of the electrode.

11. A plasma arc torch comprising:
 a main torch body;
 an electrically conductive nozzle fixed with respect to the main torch body;
 an electrode holder arranged within the main torch body such that the electrode holder is axially movable relative to the main torch body;
 an electrode releasably attached to the electrode holder, wherein an end face of the electrode is configured to electrically contact an opposing surface of the nozzle when the electrode holder is moved towards the nozzle to initiate a pilot arc and the wear of the end face is less than a predetermined amount, the electrode defining an outer surface and a projection extending radially outwardly from the outer surface, the electrode having an axial length L defined between a forward-facing surface of the projection and the end face of the electrode; and
 an electrically non-conductive wear stop fixedly mounted within the main torch body, wherein the wear stop is configured to engage the projection only when the length L is shorter than a predefined length due to the wear of the end face of the electrode during use of the plasma arc torch;
 wherein engagement of the wear stop with the electrode prevents the electrode from moving axially towards the nozzle, such that continued wearing away of the end face of the electrode prevents electrical contact between the end face and the nozzle and precludes initiation of the pilot arc.

12. The plasma arc torch of claim 11 further comprising a power source electrically connected to the electrode, wherein the power source is configured to apply a voltage differential between the electrode and the nozzle to initiate the pilot arc when the electrode is in electrical contact with the nozzle.

13. The plasma arc torch of claim 12 further comprising a sensor configured to detect a state of an electrical circuit defined between the electrode and the nozzle when the voltage differential is applied.

14. The plasma arc torch of claim 13, wherein the power source includes the sensor.

15. The plasma arc torch of claim 13 further comprising an indicator in communication with the sensor, wherein the indicator is configured to provide an indication to a user of the state of the electrical circuit detected by the sensor.

16. The plasma arc torch of claim 15, wherein the indicator is configured to notify a user when the state of the electrical circuit detected is an electrical discontinuity between the electrode and the nozzle.

17. The plasma arc torch of claim 11, wherein the length L corresponds to an approximate amount of time the electrode is usable in the plasma arc torch before the wear stop engages the projection and prevents the end face of the electrode from making electrical contact with the opposing surface of the nozzle.

18. The plasma arc torch of claim 11, wherein the main torch body and the electrode holder are configured such that the electrode holder is able to individually receive electrodes having different lengths L prior to any wear of the end face of the electrode.

19. A plasma arc torch comprising:
a main torch body;
an electrically conductive nozzle that is axially movable relative to the main torch body, wherein the nozzle defines a projection;
an electrode holder fixedly mounted within the main torch body;
an electrode releasably attached to the electrode holder, wherein an end face of the electrode is configured to electrically contact an opposing surface of the nozzle when the nozzle is moved towards the electrode to initiate a pilot arc and the wear of the end face is less than a predetermined amount; and
an electrically non-conductive wear stop fixedly mounted within the main torch body, wherein the wear stop is configured to engage the projection only when the end face of the electrode has experienced a predetermined amount of wear during use of the plasma arc torch;
wherein engagement of the wear stop with the projection prevents the nozzle from moving axially towards the electrode, such that continued wearing away of the end face of the electrode prevents electrical contact between the end face and the nozzle and precludes initiation of the pilot arc.

20. The plasma arc torch of claim 19 further comprising a power source electrically connected to the electrode and a sensor, wherein the power source is configured to apply a voltage differential between the electrode and the nozzle to initiate the pilot arc when the electrode is in electrical contact with the nozzle, and wherein the sensor is configured to detect a state of an electrical circuit defined between the electrode and the nozzle when the voltage differential is applied.

21. An electrode for use in a blow-back type plasma arc torch comprising a nozzle, the electrode configured to be axially movable with respect to a nozzle of the plasma arc torch and to initiate a pilot arc within the plasma arc torch,
wherein the electrode defines an end face, an axial length L, and an outer surface, and
wherein the electrode further defines a projection extending radially outwardly from the outer surface, wherein the projection is configured to engage a non-conductive wear stop disposed within the plasma arc torch when the length L is shorter than a predefined length due to wear of the end face during use of the plasma arc torch, such that engagement of the projection with the wear stop prevents the electrode from moving axially towards the nozzle and continued wear of the end face precludes initiation of the pilot arc.

22. The electrode of claim 21, wherein the electrode comprises:
an electrode blank defining a bore at one end; and
an emissive element configured to fit within the bore such that the end face of the electrode includes part of the electrode blank and part of the emissive element.

\* \* \* \* \*